United States Patent
David et al.

(10) Patent No.: US 6,911,977 B2
(45) Date of Patent: Jun. 28, 2005

(54) METHOD AND DEVICE FOR RESTORING A LIGHT SIGNAL

(75) Inventors: Laurent David, Nantes (FR); Samuel Carre, Treillieres (FR)

(73) Assignee: Centre Scientifique et Technique du Batiment (CSTB), Paris (FR)

( * ) Notice: Subject to any disclaimer, the term of this patent is extended or adjusted under 35 U.S.C. 154(b) by 189 days.

(21) Appl. No.: 10/181,675

(22) PCT Filed: Jan. 15, 2001

(86) PCT No.: PCT/FR01/00117

§ 371 (c)(1),
(2), (4) Date: Jul. 16, 2002

(87) PCT Pub. No.: WO01/54419

PCT Pub. Date: Jul. 26, 2001

(65) Prior Publication Data

US 2003/0006985 A1 Jan. 9, 2003

(30) Foreign Application Priority Data

Jan. 17, 2000 (FR) .......................................... 00 00515

(51) Int. Cl.$^7$ .............................................. G06T 15/60
(52) U.S. Cl. ..................... 345/426; 345/582; 345/597; 345/84; 345/88; 348/743; 348/757; 348/675; 348/671
(58) Field of Search ............................ 345/427, 84, 88, 345/582, 597, 426, 77, 72; 348/743, 757, 674, 745, 671, 675

(56) References Cited

U.S. PATENT DOCUMENTS

| | | | |
|---|---|---|---|
| 5,612,753 A | | 3/1997 | Poradish et al. |
| 5,663,775 A | * | 9/1997 | Kawamura et al. .......... 348/751 |
| 6,219,011 B1 | * | 4/2001 | Aloni et al. .................. 345/1.3 |
| 6,411,047 B1 | * | 6/2002 | Okazaki et al. .............. 315/312 |

FOREIGN PATENT DOCUMENTS

| | | |
|---|---|---|
| EP | 0 680 222 | 11/1995 |
| JP | 02 123344 | 7/1990 |

* cited by examiner

Primary Examiner—Kimbinh T. Nguyen
(74) Attorney, Agent, or Firm—DLA Piper Rudnick Gray Cary US LLP

(57) ABSTRACT

A method for restoring a light signal from digital data defining a colorimetric coordinate of the light signal in a specific colorimetric system, comprises the step of generating a first light signal using a first light restoration unit, the step of generating a second light signal using a second light restoration unit, and the step of generating a third light signal obtained by superimposing the first and second light signals. The second light restoration unit covers a brightness dynamics less than the brightness dynamics covered by the first restoration light unit. The second light restoration unit has a brightness resolution finer than the first light restoration unit.

34 Claims, 4 Drawing Sheets

METHOD AND DEVICE FOR RESTORING A LIGHT SIGNAL

TECHNICAL FIELD

The present invention relates to a method of restoring a light signal from digital data defining at least one colorimetric coordinate of the light signal in a particular colorimetric system, each colorimetric coordinate being encoded over N data bits and corresponding to a brightness value associated with a particular component of the light signal in the colorimetric system.

The invention relates to the field of digital imaging, and is applicable to any type of digital light restoration unit. The invention is described below in its application to a digital light restoration unit operating by optical projection of an image onto a screen. Such a unit is called a video projector. However, this choice is not limiting, and the invention is also applicable, in particular, to a digital light restoration unit operating by means of a display on an electronic screen of the CRT (Cathode Ray Tube), liquid crystal, plasma or other type.

BACKGROUND OF THE INVENTION

Any light signal can be expressed in the form of a spectrum $S(\lambda)$, where $\lambda$ denotes a wavelength, the significant values of which are generally between 380 and 780 nm (nanometers) in the visible region. By means of digital processing, this spectrum is projected onto a colorimetric coordinate system specific to a particular colorimetric system. The best known of these colorimetric systems is the trichromatic Red, Green, Blue system (hereinafter known as the RGB system). Thus a triplet of colorimetric coordinates is obtained corresponding to the expression of the light signal in said particular colorimetric system. These coordinates correspond to light intensity values respectively associated with three chromatic components of the light signal, called R, G and B in the RGB system. Each one is encoded over N data bits, such that a triplet is encoded over 3N data bits. The invention is described hereinafter in its application to a digital light restoration unit operating according to the RGB system. However, this choice is not limiting, and the invention may also be applied, in particular, to a digital light restoration unit operating according to other conventional colorimetric systems, such as the XYZ system.

Video projectors which operate according to the RGB system (hereinafter called RGB video projectors) accept digital input data defining, in the RGB system, the colorimetric coordinates of the light signal to be restored. For an image of particular dimensions projected onto a white screen, they can produce brightness values belonging to a set of discrete values. It may be recalled that the brightness is a quantity which characterizes the intensity of the light perceived by the human visual system. The brightness is therefore related to the light intensity emitted by the video projector, in relation to the surface area of the image projected onto the screen. It is measured in $cd/m^2$ (candela per square meter). In the present account, it is considered that a video projector generates an image of particular dimensions onto a screen, for example an image of $1\ m^2$, such that brightness values rather than light intensity values are discussed. In the case of a colorimetric system such as the RGB system, the brightness is a nonchromatic additive quantity. Consequently, the brightness at any point of an image generated from an RGB video projector is substantially equal to the sum of the brightnesses associated with each R, G and B component at this point.

For RGB video projectors which are currently available, the digital input data are encoded over 24 bits, 8 bits for each R, G and B component. In other words, for these video projectors, the value of N is eight (N=8). It is thus possible to obtain up to $2^{24}$, that is nearly 16 500 000 different colors or hues. Each colorimetric coordinate therefore corresponds, for the corresponding colorimetric R, G or B component, to a brightness value included within a set of $2^8$=256 possible discrete values. These values, respectively called $L_R$, $L_G$ and $L_B$, are denoted by a level between a minimum level 0 (zero brightness) and a maximum level 255 (maximum brightness). The maximum brightness value of any light signal is theoretically obtained by setting the three R, G and B components to the level 255.

Currently, RGB video projectors are available covering a dynamic brightness range from 0 to about 250 $cd/m^2$. Assuming that these R, G and B components are equal, (hues are discussed in terms of gray levels to denote the $2^8$=256 possible hues), such a video projector then has brightness steps substantially equal to 1 $cd/m^2$. Such brightness steps are small enough to enable color transitions to be produced which, for the human visual system, appear overall to be continuous. However, it is currently sought to increase the dynamic brightness range of the video projectors in order to obtain images which are closer to reality. It would of course be possible to manufacture video projectors covering a higher dynamic brightness range, for example from 0 to about 250 000 $cd/m^2$, by providing them with a more powerful light source. On the other hand, this higher dynamic range would be covered by correlatively higher brightness steps, substantially equal to 100 $cd/m^2$, which would no longer make it possible to obtain color transitions perceived overall as continuous. The result of this is that, for example, the display of a color degradation would appear to the user as a succession of bands of discontinuous color in the optical spectrum. This drawback is associated with the technology of video cards which are currently used for and in the video projectors, and which process digital input data encoded over at the most 8 bits. Now, at present there are no video cards available which process digital data encoded over a larger number of bits, which would make it possible to avoid this problem.

One aim of the invention is to enable a light signal to be restored with a dynamic brightness range which is higher than that of the video projectors currently available, without incurring the aforementioned drawback.

SUMMARY OF THE INVENTION

According to the invention, this aim is achieved by virtue of a method of light restoration of the type defined in the introduction, which comprises the steps consisting in:

a) processing said N data bits so as to generate a first light signal, by means of a first light restoration unit which can produce brightness values in a first set of discrete values covering a first dynamic brightness range;

b) processing said N data bits so as to generate at least a second light signal, by means of a second light restoration unit which can produce brightness values in a second set of discrete values covering a second dynamic brightness range, less than said first dynamic brightness range, the second light restoration unit having a brightness resolution which is finer than the first light restoration unit;

c) generating a third light signal obtained by superimposing said first and second light signals.

In this way, a resultant light signal (the third light signal) is obtained which can present brightness values within a third set of discrete values substantially covering the first dynamic brightness range with brightness steps substantially equal to the second step value. If two video projectors are used, accepting digital data encoded over more than eight bits as an input, each of the first and second light signals may have a brightness value encoded over at the most eight bits. The result of this is that provision can be made that the number N of bits encoding the colorimetric coordinates of the light signal be, at most, equal to sixteen (N=16). This amounts to increasing the fineness of the encoding of the colorimetric coordinates by circumventing the limit imposed by the technology of the video cards and of the video projectors. Of course, the number N can be further increased by using other video projectors. The invention therefore makes it possible to generate a light signal with brightness values belonging to a set of discrete values covering a high dynamic brightness range with small brightness steps. In other words, the first light signal generated in step a) contributes to the dynamic range of the third signal, and the second signal generated in step b) contributes to the fineness of the brightness steps of this third signal. The principle of the invention consists of a new application of the property that the brightness has of being an additive quantity.

The invention further proposes a device suitable for implementing the above light restoration method. This is because it proposes a device for restoring a light signal from digital data defining at least one colorimetric coordinate of the light signal in a particular colorimetric system, each colorimetric coordinate being encoded over N data bits and corresponding to a brightness value associated with a particular component of the light signal in the colorimetric system, characterized in that it comprises:

a first light restoration unit which can produce brightness values in a first set of discrete values covering a first dynamic brightness range;

at least a second light restoration unit which can produce brightness values in a second set of discrete values covering a second dynamic brightness range, less than said first dynamic brightness range, with a finer brightness resolution;

management means to control said first and second light restoration units as a function of said N data bits so that they produce a first and a second light signal, respectively, said first and second light restoration units furthermore being arranged to produce a third light signal obtained by superimposing said first and second light signals.

DESCRIPTION OF PREFERRED EMBODIMENTS

The principle of the invention is described below by considering first of all the simple case of a gray-level colorimetric system. In such a colorimetric system, a light signal is defined by one and only one colorimetric coordinate which corresponds to a brightness value, hereinafter called $L_0$, associated with the only component of the light signal in this system. Note that it is easy to pass from a trichromatic system such as the RGB system to a gray-level system by applying the same command to the three R, G and B components such that they are always at identical levels. Moreover, it is considered that the behavior of the device is linear, that is to say that variations of the input command result in corresponding variations of the brightness values generated.

Figure 1:
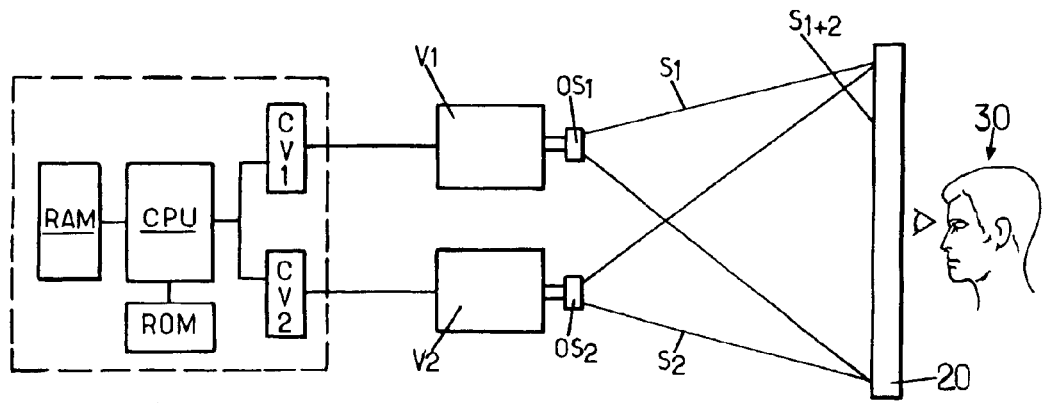
FIG. 1: the diagram of a device according to the invention in the case of a gray-level colorimetric system.

In FIG. 1, a device according to the invention comprises a first video projector V1 having a particular maximum light flux F1 and at least a second video projector V2 having a particular maximum light flux F2, such that F2 equals F1/K, where K is a number greater than one. Preferably, the ratio K of the flux F1 to the flux F2 is an integer power of two, that is to say that $K=2^q$, where q is an integer. In one example, K=256, and therefore q=8. In FIG. 1, the video projector V2 is shown schematically as smaller than the video projector V1 so as to take account of the difference between their respective maximum light fluxes.

The video projector V1 enables a maximum brightness value equal to $L_{max1}$ to be generated on a screen 20. The video projector V2 enables a maximum brightness value equal to $L_{max2}$ to be generated on the screen 20. Of course, these maximum values depend on the area of the image that they generate on the screen 20. This area depends on the distance between the output optics $OS_1$ and $OS_2$ of the video projectors V1 and V2, respectively, on the one hand, and the screen 20, on the other hand, and on the adjustment of the magnification introduced by their output optics $OS_1$ and $OS_2$. With a screen 20 operating in transmission, the user 30 stands on the side of the screen away from the video projectors V1 and V2. The screen 20 is preferably of the "Fresnel lens" type, having high brightness efficiency and good brightness uniformity for a given observer position. In the case of a completely linear device, the maximum brightness values that the two video projectors can generate have the same proportionality ratio as their maximum light fluxes. In other words, $L_{max2}$ is substantially equal to $L_{max1}/K$. Each of the video projectors V1 and V2 is coupled to the output of a video card, CV1 and CV2 respectively. In this case, these video cards consist of a management unit 10. The latter further comprises a central processing unit CPU connected to an RAM memory of the random access memory type, and possibly to an ROM memory of the read-only memory type.

The CPU unit delivers digital data encoded over N data bits divided into at least two groups of $c_1$ and $c_2$ bits, respectively, where $c_1$ and $c_2$ are numbers such that $N=c_1+c_2$. These two groups of bits correspond to commands C(V1) and C(V2) of light restoration units V1 and V2, respectively. These command data are transmitted to the input of video cards CV1 and CV2. Conventionally, the video cards process digital data encoded at the most over 8 bits. Therefore, in an example, it is considered that N is equal to sixteen, and that the values of $c_1$ and $c_2$ are eight (N=16; $c_1=c_2=8$).

The video projector V1 can produce brightness values within a first set of discrete values covering a first dynamic brightness range $0-L_{max1}$ between 0 and $L_{max1}$. In the simple case of a regular distribution of the brightness values between 0 and $L_{max1}$, the first dynamic range $0-L_{max1}$ is covered with constant brightness steps over the entire dynamic range, having a first step value equal to $L_{max1}/2^{c_1}$. Similarly, the video projector V2 can produce brightness values within a second set of discrete values covering a dynamic brightness range $0-L_{max2}$ between 0 and $L_{max2}$. In the simple case of a regular distribution of the brightness values between 0 and $L_{max2}$, the second dynamic range $0-L_{max2}$ is covered with constant brightness steps over the entire dynamic range, having a second step value which is equal to $L_{max2}/2^{c_2}$. These examples of a regular distribution of the brightness values is not however limiting. This is because the density of the brightness values can be varied within the dynamic range covered. The second dynamic brightness range is less than the first dynamic brightness range. In other words, $L_{max2}$ is less than $L_{max1}$. Moreover, the brightness resolution of the second light restoration unit V2 is finer than that of the first light restoration unit V1. In the case of regular distributions of brightness values envisioned above, this means that the second brightness step value $L_{max2}/2^{c_2}$ is less than the first brightness step value $L_{max1}/2^{c_1}$. Preferably, the second dynamic brightness range $0-L_{max2}$ corresponds substantially to the interval $0-\Delta L$, where $\Delta L$ is the accuracy of the brightness of the first light restoration unit V1, that is to say the greatest difference between two successive values of said first set of brightness values. In the case of regular distributions of brightness values envisioned above, this means that $\Delta L$ is equal to the first brightness step value $L_{max1}/2^{c_1}$. In other words, $L_{max2} \approx L_{max1}/2^{c_1}$. This amounts to saying that K is equal to $2^{c_1}$, that is to say that q equals $c_1$.

The way in which the video projectors V1 and V2 are controlled by the management unit in order to restore a light signal defined by a colorimetric coordinate corresponding to a brightness value $L_0$, less than $L_{max1}$, will now be described with reference to the graphs of FIGS. 2a and 2b. In these graphs, the curve of the brightness values L(V1) and L(V2) that can be produced by the video projectors V1 and V2, respectively, according to a command C(V1) and C(V2), respectively, is partly shown. Since these values are discrete, the curves of FIGS. 2a and 2b appear as quantized linear functions, that is to say that they have a "staircase" shape. In the case of regular distributions of the brightness values envisioned above, the height of the "stairs" then corresponds to the first brightness step value $L_{max1}/2^{c_1}$ and to the second brightness step value $L_{max2}/2^{c_2}$, respectively.

Figure 2A:
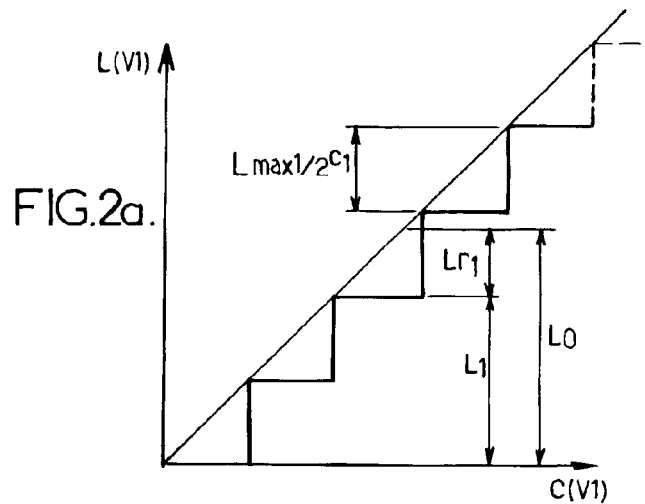
FIGS. 2a and 2b: graphs partly showing the curve of brightness values which can be produced by the first and second light restoration unit, respectively, according to the invention.
Figure 2B:
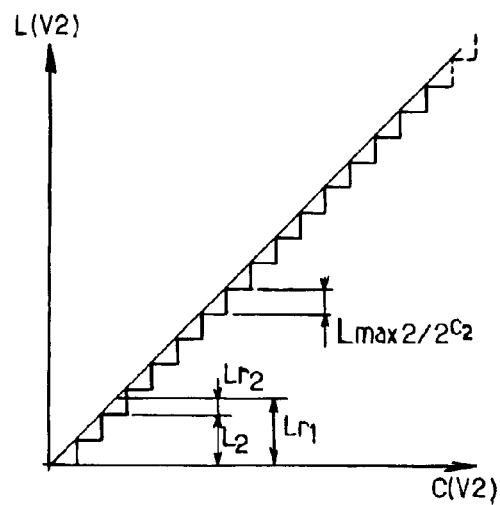

In FIG. 2a, the brightness value just less than $L_0$ which can be generated by the video projector V1 is called $L_1$. The number defined by the integer part of $L_0/(L_{max1}/2^{c_1})$ is called $n_1$. In the example shown in the Figure, $n_1=2$, that is to say that $L_1$ corresponds to the second nonzero brightness level that the video projector V1 can produce. The difference $L_0-L_1$ is called $L_{r1}$. This value $L_{r1}$ corresponds in a way to the error with which the video projector V1 is able to produce the brightness value $L_0$ on the screen. In FIG. 2b, the brightness value just less than $L_{r1}$ which can be generated by the video projector V2 is called $L_2$. The number defined by the integer part of $L_{r1}/(L_{max2}/2^{c_2})$ is called $n_2$. In the example shown in the Figure, $n_2=2$, that is to say that $L_2$ corresponds to the second nonzero brightness level that the video projector V2 can produce. The difference $L_{r1}-L_2$ is called $L_{r2}$. This value $L_{r2}$ corresponds in a way to the error with which the video projector V2 is able to produce the brightness value $L_{r1}$ on the screen, that is to say, also the error with which the set formed by video projectors V1 and V2 is able to produce the brightness value $L_0$ on the screen. It will be noted that the definition of $L_2$ above is only needed for the purpose of adding a third video projector enabling the brightness value $L_{r2}$ to be obtained as closely as possible. Where only two video projectors V1 and V2 are used, $L_2$ can be defined as the brightness value closest to $L_{r1}$ (less than or greater than $L_{r1}$) which the second video projector V2 can produce.

As will be understood, the command C(V1) generated by the CPU unit and encoded over $c_1$ bits, is such that the video projector V1 produces a light signal $S_1$ with a brightness value equal to $L_1$, while the command C(V2) generated by the CPU unit and encoded over $c_2$ bits is such that the video projector V2 produces a light signal $S_2$ having a brightness value equal to $L_2$. By superimposing the two light signals $S_1$ and $S_2$, a third light signal $S_{1+2}$ is generated having a brightness value equal to $L_1+L_2$, due to the additive property of the brightness.

Figure 3:
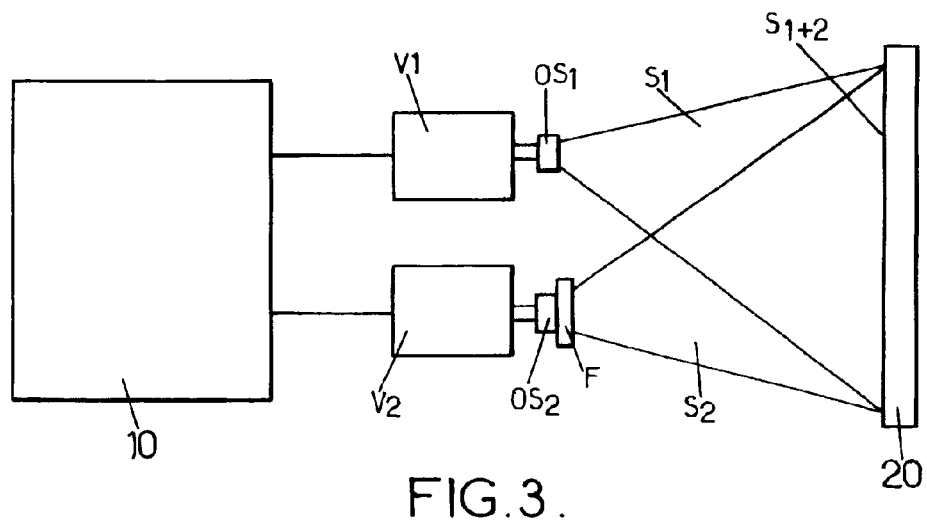
FIG. 3: the diagram of a variant of the device of FIG. 1.

In a first embodiment according to FIG. 1, this result is obtained by simultaneously projecting the two light signals $S_1$ and $S_2$ onto the screen 20. In other words, the third light signal $S_{1+2}$ is obtained by the optical superposition of the light signals $S_1$ and $S_2$ on the screen 20. Of course, it is then necessary for the two light signals $S_1$ and $S_2$ to coincide exactly on the screen. Now the two video projectors V1 and V2 cannot have the same optical axis. It is for this reason that their output optics $OS_1$ and $OS_2$ comprise means to move the emission of the light signal away from the center with respect to their respective optical axis. These means enable the two light signals to be exactly superimposed on the screen 20. The offset which may remain between the two projected light signals can be processed by software, within the management unit 10, according to a technique which will be returned to below. This embodiment is advantageous since it uses two video projectors of the sort that are currently available. According to a preferred embodiment shown in FIG. 3, it may involve two video projectors having the same nominal light flux, for example at least equal to 6 000 lumen ANSI, one of which V2 is coupled to a filter F in order to reduce its maximum light flux by a factor equal to K. In FIG. 3, the same elements as in FIG. 1 bear the same references. Moreover, and unlike FIG. 1, the video projector V2 is shown schematically as the same size as the video projector V1 in order to take account of the equality of their respective nominal light fluxes. This embodiment is advantageous since it uses two identical video projectors, which makes it easier to adjust the superposition of the signals $S_1$ and $S_2$ on the screen.

Figure 4:
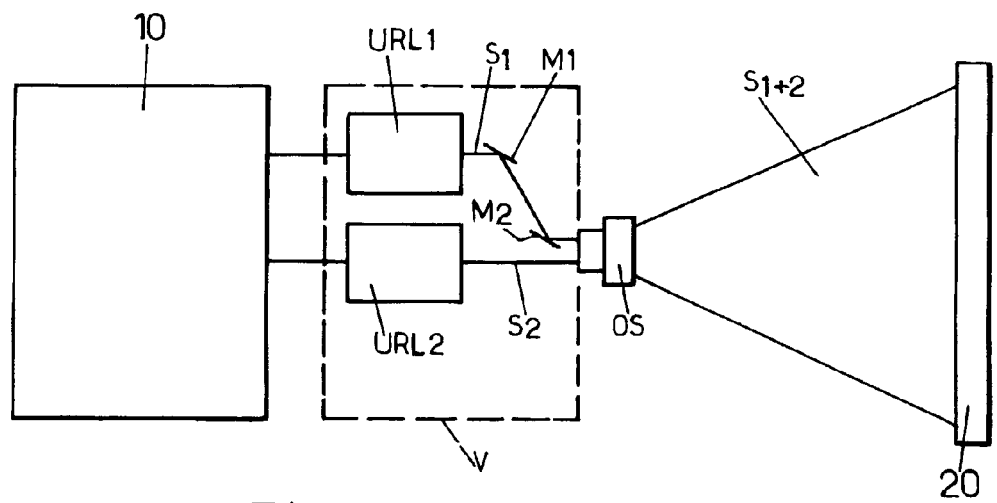
FIG. 4: the diagram of another embodiment of the device of FIG. 1.

In another embodiment, the optical superposition of the light signals $S_1$ and $S_2$ is obtained inside a video projector, that is to say before passing through the output optics. In this case, the video projector is of a particular type, shown schematically in FIG. 4, in which it bears the reference V. In FIG. 4, the same elements as in FIG. 1 and as in FIG. 3 bear the same references. The video projector V comprises two light restoration units URL1 and URL2 generating the first and second light signals $S_1$ and $S_2$ respectively, and means to collimate these two signals onto the output optics OS of the video projector. Such means may, for example, consist of two mirrors M1 and M2. By virtue of these means, the light signals $S_1$ and $S_2$ are superimposed in the internal optical system of the video projector, that is to say before projection onto the screen 20 via the output optics OS. In other words, the third signal $S_{1+2}$ is obtained by superimposing light signals $S_1$ and $S_2$ in the optical system of the video projector. This embodiment has the advantage of requiring only one output optic instead of two as in the previous embodiment (FIGS. 1 and 3). Since this piece of equipment is a complex part, which mainly determines the price of the apparatus, a substantial saving could thus be made compared to the previous embodiment. Nevertheless, it would then be necessary to design a particular video projector, specific to the implementation of the invention.

It is possible to show that, under certain conditions, the method of generating a light signal by super-imposing two light signals is equivalent to increasing the fineness of the encoding. This is because, if the brightness values produced by each video projector V1, V2, respectively, cover the dynamic range $0-L_{max1}$, $0-L_{max2}$, respectively, with regular brightness steps, then:

$$L_{r1} < L_{max1}/2^{c_1} \quad (1)$$

$$L_{r2} < L_{max2}/2^{c_2}$$

Moreover, it is recalled that the ratio of the maximum light fluxes of the video projectors V1 and V2 is chosen such that:

$$L_{max2} \approx L_{max1}/2^{c_1} \quad (2)$$

Furthermore, by definition, $L_{r2}$ is given by the following equation:

$$L_{r2} = L_{r1} - L_2 \quad (3)$$

Therefore, equations (1), (2) and (3) imply:

$$L_{r2} < (L_{max1}/2^{c_1})/2^{c_2}$$

$$L_{r2} < L_{max1}/2^{c_1+c_2} \quad (4)$$

Equation (4) clearly expresses, within the context of the assumptions mentioned above, the error with which the device according to the invention enables the brightness $L_0$ to be obtained by using a single video projector having a dynamic range $0-L_{max1}$ and which would accept digital data encoded over $N=c_1+c_2$ bits (that is to say 16=8+8 bits in the example). The invention therefore makes it possible to restore a light signal whose colorimetric coordinate values ($L_0$ in the example) are encoded over at the most sixteen bits, by using only video projectors accepting digital input data encoded over at most eight bits.

In practice, various values of the ratio K between the light flux F1 of the video projector V1 and the light flux F2 of the video projector V2 can be chosen. In the account above, the value retained was $K=2^8$ (q=8). Given the limits of encoding over eight bits of digital input data allowed by the current video projectors, this value gives the best result in terms of improving the fineness of the encoding of the colorimetric coordinate values. Nevertheless, in some cases, it may be wise to choose a lower ratio. This is because some video projectors have a display quality for black which degrades with the amount of white to be displayed in the same image (maximum contrast), because of light leakage phenomena in the apparatus. The terms fogging or white noise are used to denote the effect produced by this light leakage. In order to limit this phenomenon within the context of the invention, it is possible to minimize the use of the more powerful video projector, that is to say V1, and to increase the use of the less powerful video projector, that is to say V2. This is because it is the former which causes the greater degradation in the display quality for black. To do this, it is possible to increase the maximum flux of the less powerful video projector, that is to say V2, with respect to the maximum flux of the more powerful video projector, that is to say V1. Thus, for example, a ratio K will be chosen such that $K=2^q$ where q is a number less than eight (q<8). This makes it possible to improve the display quality for black, but involves a smaller increase in the fineness of the encoding of the colorimetric coordinates. This is because, with a ratio $K=2^4=16$, for example, the colorimetric coordinates are encoded over only 12 bits (N in the general case). More specifically, the command C(V1) of the more powerful video projector V1 is preferably encoded over $c_1=4$ bits ($c_1=q$ bits in the general case), such that the dynamic brightness range $0-L_{max1}$ of this video projector is covered with brightness steps equal to $L_{max1}/16$ ($L_{max1}/2^q$ in the general case). In other words, the colorimetric coordinates of the light signal to be generated by the more powerful video projector V1 are encoded over $2^q$ bits. The command C(V2) for the less powerful video projector V2 is then encoded over $c_2=8$ bits ($c_2=N$ bits in the general case), such that the dynamic brightness range $0-L_{max2}$ of this video projector is covered by brightness steps equal to $L_{max2}/256$ ($L_{max1}/2^{N-q}$ in the general case). In other words, the colorimetric coordinates of the light signal to be generated by the less powerful video projector V2 are encoded over $2^{N-q}$ bits.

Thus, as will be understood, the invention is not limited to using two light restoration units V1 and V2 generating two light signals $S_1$ and $S_2$ which are super-imposed. It is also applicable to the use of any number n (where n is a number greater than one) of such light units Vi, each generating a light signal $S_i$ with a brightness $L_1$, the signals $S_i$ then being superimposed in order to obtain a resultant brightness equal to $$\sum_{1 \leq i \leq n} L_i.$$

If the difference $$L_{ri} = L_0 - \sum_{1 \leq i \leq n} L_i$$

is called $L_{ri}$, then it is noticed that subsequently $L_{ri}$ tends toward zero as i tends toward infinity. In other words, the greater the number of video projectors used, the smaller the error with which all these video projectors are able to restore any brightness value $L_0$.

The principle of the invention will now be described by considering the case of a trichromatic colorimetric system, such as the RGB system. In a system of this sort, a light signal is defined by three chromatic components, hereinafter called $L_R$, $L_G$ and $L_B$.

Furthermore, the behavior of the device is still considered to be linear. It will be noted that methods of restoring a light signal defined in such a colorimetric system are known, consisting in generating three light signals, one for each of the three chromatic components, then in generating a resultant light signal, obtained by superimposing these three light signals, for example on a screen. This constitutes a known example of applying the property that the brightness has of being an additive quantity.

Let us consider a light signal to be restored, defined by its spectrum $S(\lambda)$. The commands $C_R$, $C_G$ and $C_B$ which should be applied to the input of an RGB video projector in order to display this light signal are merged with the respective colorimetric coordinates, in the coordinate system of the RGB system, of the signal to be restored. Consequently, they are determined by the following formulae:

$$C_R = \int_{\lambda a}^{\lambda b} S(\lambda) \cdot \bar{r}(\lambda) d\lambda;$$

$$C_G = \int_{\lambda a}^{\lambda b} S(\lambda) \cdot \bar{g}(\lambda) d\lambda;$$

$$C_B = \int_{\lambda a}^{\lambda b} S(\lambda) \cdot \bar{b}(\lambda) d\lambda;$$

where the functions $\bar{r}$, $\bar{g}$ and $\bar{b}$ represent generic or specific curves from the light restoration unit used to restore each R, G and B component, respectively, and where the values $\lambda a$ and $\lambda b$ are the ad-hoc limits of the spectrum $S(\lambda)$ of the signal. The commands $C_R$, $C_G$ and $C_B$ are applied to the input of the video projector. They cause the light signals to be generated, corresponding respectively to each chromatic component of the signal to be restored and having brightness values $L_R$, $L_G$ and $L_B$. In the prior art, each of them is encoded at the most over eight bits, given the eight-bit technology of video cards.

The method aiming to improve the fineness of the encoding of the colorimetric coordinates described above may be applied independently to each of the chromatic components $L_R$, $L_G$ and $L_B$ of the light signal. In an example, the method according to the invention then consists in generating three groups of n light signals, called $S_{Ri}$, $S_{Gi}$ and $S_{Bi}$ where i ranges from 1 to n, each group being associated with a respective chromatic component, that is to say 3n light signals in total, then in generating a resulting light signal, obtained by superimposing these 3n signals.

Figure 5:
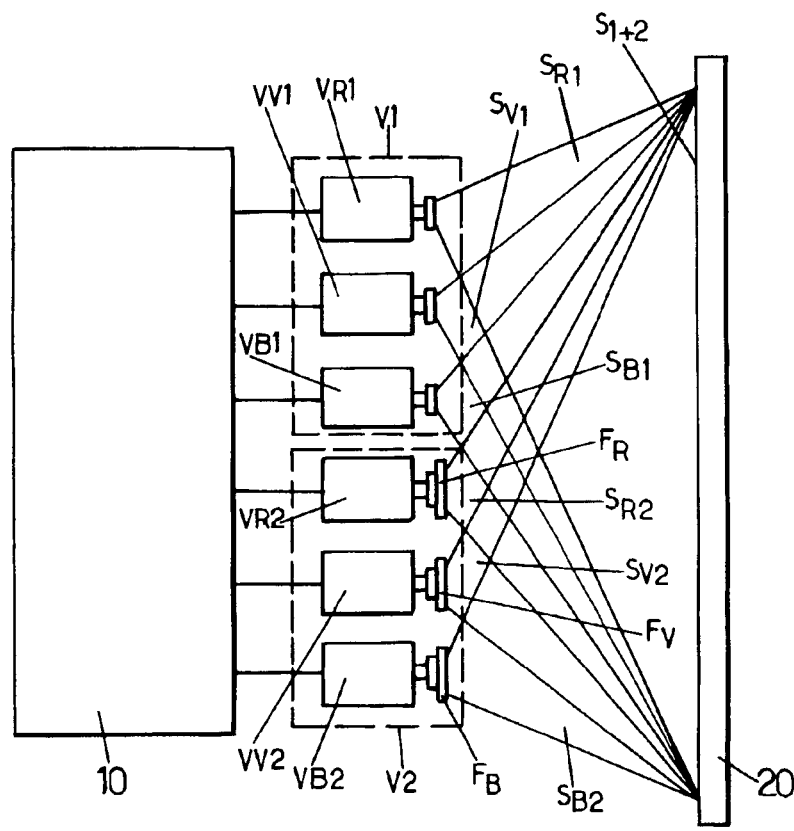
FIG. 5: the diagram the diagram of a device according to the invention in the case of a trichromatic RGB colorimetric system.

In FIG. 5, an example of a device for implementing the method according to the invention is shown in the case of such a colorimetric system. This exemplary embodiment is inspired by the variant of FIG. 3, for which n is equal to two. This is because the preferred device then comprises three pairs of light restoration units, each pair VR1–VR2, VG1–VG2 and VB1–VB2 of which is suited to restoring a light signal associated with the respective chromatic component R, G and B of the light signal to be restored. The output optics of the units VR2, VG2 and VB2 are coupled to respective filters, referenced $F_R$, $F_G$ and $F_B$, respectively, in order to comply with a particular ratio of their maximum light flux to the maximum light flux of the other unit of each pair, that is VR1, VG1 and VB1, respectively. These ratios are called $K_R$, $K_G$ and $K_B$, respectively. It will be noted that the ratios $K_R$, $K_G$ and $K_B$ do not have to be equal to each other. Preferably they are written as integer powers of two, that is $K_R=2^{q_R}$, $K_G=2^{q_G}$ and $K_B=2^{q_B}$, where $q_R$, $q_G$ and $q_B$ are integers which are not necessarily equal. The light restoration units VR1, VR2, VG1, VG2, VB1 and VB2 receive commands $C_{R1}$, $C_{R2}$, $C_{G1}$, $C_{G2}$, $C_{B1}$ and $C_{B2}$ in order to generate light signals $S_{R1}$, $S_{R2}$, $S_{G1}$, $S_{G2}$, $S_{B1}$ and $S_{B2}$, respectively with brightness values $L_{R1}$, $L_{R2}$, $L_{G1}$, $L_{G2}$, $L_{B1}$ and $L_{B2}$, respectively. These light signals are directly superimposed by projection onto the screen 20 in order to obtain a resulting signal $S_{1+2}$. This resulting signal has a brightness value L to within the accuracy of the device.

For the rest, that which was said above, within the context of a gray-level colorimetric system, is applicable, independently for each chromatic component R, G and B, to the case of a trichromatic colorimetric system such as the RGB system. Of course, this also applies to the case of another colorimetric system, such as the XYZ system, for example. This also applies to any colorimetric system in which the number of chromatic components is other than three.

In practice, the light restoration units VR1, VG1 and VB1 are included in a first RGB video projector referenced V1, while the light restoration units VR2, VG2 and VB2 are included in a second RGB video projector referenced V2, different from the first video projector V1. Specifically, this allows the use of RGB video projectors of the sort that are currently available on the market.

It will be noted that, depending on the different embodiments, it is possible to generate intermediate light signals obtained either by the superposition, for each value of i between 1 and n, of three signals $S_{Ri}$, $S_{Gi}$ and $S_{Bi}$ associated with each respective chromatic component, or by the superposition, for each chromatic component, of n signals $S_{Ri}$, $S_{Gi}$ and $S_{Bi}$ respectively for i ranging from 1 to n. In the first case, n intermediate light signals are obtained. In the second, three intermediate light signals are obtained. In both cases, the resulting signal is obtained by superimposing the intermediate signals defined above. Moreover, it will be noted that, in the other exemplary embodiment, the number of light signals associated with two different chromatic components is not necessarily identical. For example, the device may comprise $n_R$ video projectors for the component $L_R$, $n_G$ video projectors for the component $L_G$, and $n_B$ video projectors for the component $L_B$, where $n_R$, $n_G$ and $n_B$ are not necessarily equal to each other.

Figure 6:
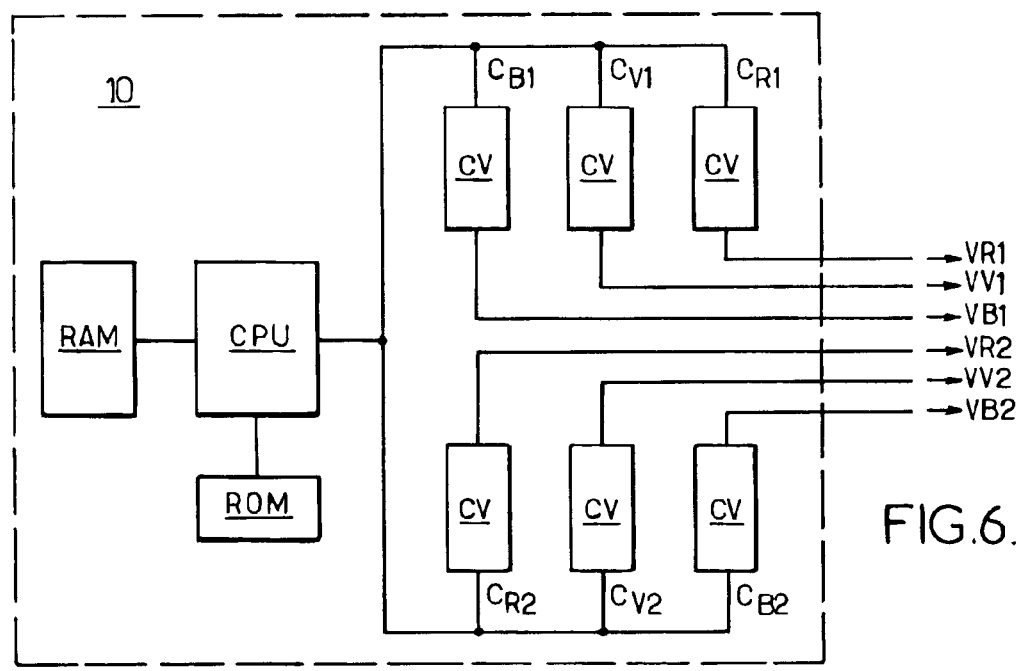
FIG. 6: the diagram of a unit for managing the device of FIG. 5.

In FIG. 6, a management unit 10 suitable for implementing the method according to the invention is shown schematically. In this Figure, the same elements as in FIGS. 1, 3 and 4 bear the same references. The central control unit is connected to an RAM memory of the random access memory type and possibly to an ROM memory of the read-only memory type, in which the digital image data to be processed are stored. These digital image data may correspond to stationary images, animated images or to images calculated in real time, depending on the type of application. They may be generated by analog/digital conversion of the analog signal delivered by an analog video transducer (an analog camera), or be generated directly by a digital video transducer (a digital camera or apparatus). They may also be generated by numerical computation within the CPU unit, in the case of a synthesized image or of an image produced by computing a physical simulation.

The central processing unit CPU is also connected to video cards CV in order to transmit to each one of them one of the commands $C_{Ri}$, $C_{Gi}$ and $C_{Bi}$ where i ranges from 1 to n (in this case, n=2). The outputs of the video cards CV are designed to be connected to the respective inputs of the light restoration units VRi, VGi and VBi. The digital image data processed in the CPU unit are encoded over N bits per colorimetric component, where the value of N is, for example, 8×n (that is to say N=16 for n=2) in the case where the video cards process digital data encoded over at most eight bits. Therefore, the definition of any light signal in the trichromatic system, which involves three different colorimetric components, makes it possible to encode the digital data over at the most 3×8×n bits (that is to say 48 bits in the example). To restore this light signal, these 48 bits are first of all broken down into three groups of 16 bits with one group per colorimetric component. The most significant bits of each group are then assigned to the commands $C_{R1}$, $C_{G1}$ and $C_{B1}$, respectively, transmitted to the video cards associated with the light restoration units VR1, VG1 and VB1, respectively, of the more powerful video projector V1, while the least significant bits of each group are assigned to the commands $C_{R2}$, $C_{G2}$ and $C_{B2}$, respectively, transmitted to the video cards associated with the light restoration units VR2, VG2 and VB2, respectively, of the less powerful video projector V2.

In practice, it is noted that some light restoration units used (especially the RGB video projectors used in the case of restoration by projection) may have brightness uniformity defects. This expression refers to the fact that the maximum brightness which can be obtained at the periphery of the screen is less than that which can be obtained at its center. It involves spatial uniformity with reference to the surface of the screen. It is desirable to process the digital image data so as to correct this uniformity defect. This is, for example, achieved with software by weighting the digital image data with a multiplication coefficient allocated to the respective regions of the screen. This coefficient is less than one, so as to attenuate the maximum brightness values that can be obtained in the regions close to the center of the screen so that they are equal to the values in the peripheral regions with less illumination. The coefficient values needed are stored in a table, called a brightness settings table, for example stored in the ROM memory of the management unit 10. This table is obtained during a phase of calibration, prior to operating the device in image restoration mode, which comprises the following steps for each colorimetric component:

a) projecting an image over the entire screen with maximum brightness at each point of the screen (for example with the commands 255,0,0 for a red image, the commands 0,255,0 for a green image, and the commands 0,0,255 for a blue image);

b) measuring the brightness in each region of the screen (a region being at best one pixel, and in general a set of adjacent pixels), for example by means of a video brightness meter (camera calibrated by brightness) placed at the assumed location of the user's eyes;

c) calculating the brightness weighting coefficients so as to obtain substantially the same brightness value in each region of the screen.

According to the invention, a brightness settings table is provided for each light restoration unit. In this way, the correction carried out for each of the light restoration units associated with a particular colorimetric component makes it possible to obtain an effect of spatial uniformity of brightness of the resulting image ($S_{1+2}$, FIGS. 1, 3 and 4) over the entire dynamic brightness range covered by the device for this colorimetric component. Moreover, this correction, carried out for each colorimetric component, also makes it possible to obtain an effect of spatial uniformity of brightness of the resulting trichromatic image ($S_{1+2}$, FIG. 5) obtained by super-imposing the images corresponding to each colorimetric component.

As a variant, the uniformity may be obtained by adding an ad-hoc filter, for example bonded directly onto the screen. The transmission level of this filter is lower at the center than at the periphery, such that the image displayed after filtering appears uniform without digital preprocessing of the light signal by the settings table. This variant is advantageous since digital preprocessing of the light signal results in a decrease in the fineness of the brightness resolution compared with the fineness that can be obtained without such a pretreatment.

Figure 7A:
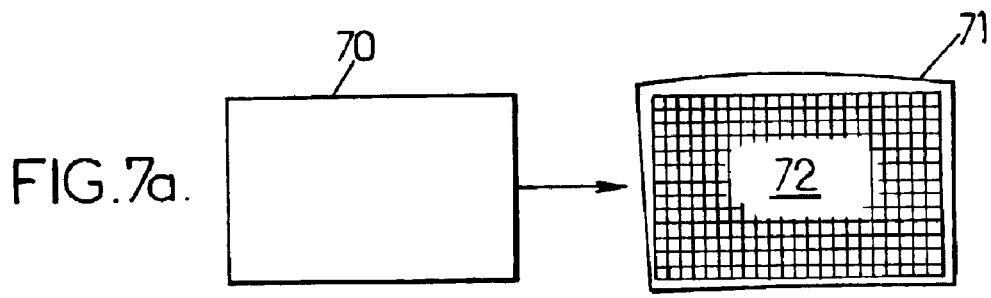
FIGS. 7a and 7b: diagrams illustrating the geometrical distortions of an image and the effect of their correction according to one aspect of the invention.

Another defect of the light restoration units that has been noticed in practice consists of the geometrical image distortions. These distortions appear, for example, on the screen in the case of restoration by projection. FIG. 7a illustrates this phenomenon. It shows how an image 70, of rectangular shape, can be restored on a screen in the form of an image 71, the shape of which is still substantially rectangular but has outlines which are not straight resulting in an overall geometrical distortion. The distortions in the image 70 can be measured by choosing a control grid as an image 70 and by comparing the restored image 71 with a reference grid 72, of the same dimensions and of the same mesh as the control grid. This defect in the light restoration units is explained by some distortion introduced by all of their optical elements. This distortion becomes particularly important in a device for implementing the method according to the invention, when the latter comprises a step of superimposing light signals. This is because any spatial shift between the light signals having to be superimposed, whether this is on the screen or inside the video projector, resulting from this distortion, could in some cases result in an actual absence of superposition. Under these conditions, there would be no addition of the respective brightnesses of these signals. This defect produces the same effect as poor adjustment of the output optics of the light restoration units, the result of which is poor adjustment of the light signals to be superimposed, which in reality are not exactly superimposed. It is for this reason, according to a feature of the invention, that they are processed in the same way. This is because, according to the invention, common means of correcting geometrical image distortions and image setting defects are provided for the light restoration device. These means are mainly software in nature. These means make it possible to improve the setting of the images that can be obtained by better adjusting the output optics of the video projectors. More specifically, they make it possible to cause, at each point of the image generated by a particular light restoration unit, a transformation such that, on the one hand, the image undergoes a distortion the inverse of that introduced by the optical elements of the light restoration unit, and that, on the other hand, it is perfectly adjusted with the images generated by the other light restoration units.

In order to determine the transformations to be carried out, a phase of measuring the spatial shift and distortion of the image comprises the following steps, carried out successively for each light restoration unit:

a) projection of a control grid by the light restoration unit;

b) comparison with a particular reference grid applied to the screen, in order to measure a drift value for each intersection of the grid displayed from the corresponding intersection of the reference grid;

c) determination and storage of transformation values to be applied to each point of the image, via bilinear interpolation between the drift values of the intersections close to the control grid.

Naturally, the same reference grid should be used, in step b), for each light restoration unit, in order to obtain the correct adjustment for the images with respect to each other. With regard to step c), it will be noted that each point of the image is necessarily inside a mesh of the control grid, and that consequently its transformation value is deduced from the drift values of the (at most) four ends of these meshes for which a measurement was carried out in step b). It will be noted that the smaller the mesh of the control grid and the reference grid, that is to say the greater the number of points for which the drift value is measured in step b), the better the geometrical correction resulting from computation of the transformation values carried out in step c).

Figure 7B:
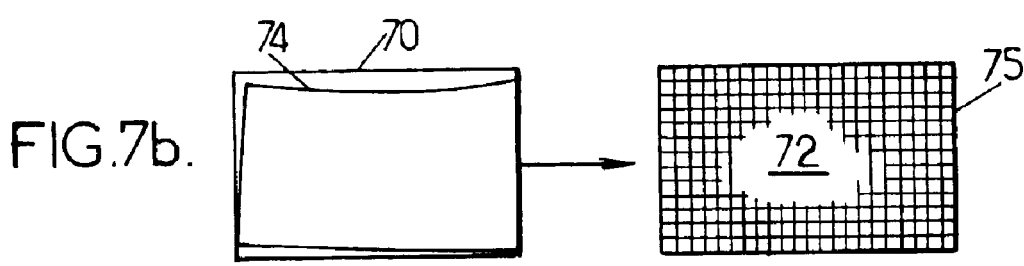

FIG. 7b shows the outlines of an image 74 resulting from the transformation applied to each of the points of the image 70 to be restored, and the image 75 effectively restored by the device according to the invention from the data of the image 74 which are, more specifically, the data of the transformed image 70. By comparison with the reference grid 72, it can be seen in the Figure that this restored image 75 is perfectly rectangular and geometrically complies with the image 70.

Finally, another defect of the light restoration units used, noticed in practice, arises since their behavior is not strictly linear. Specifically, the optical response of a video projector is not perfectly related to the commands which are applied to it, in particular because of the existence of badly focused light leakage phenomena (fogging phenomenon), the magnitude of which depends on the light intensity generated. Moreover, in the case of a trichromatic video projector, there are phenomena of optical coupling of one component with the others and, furthermore, phenomena of electronic pumping between components which are associated with the limits of the electrical power supply to the video projector (mention is made of insulation defects of the various components in order to denote these two types of phenomena). The phenomenon of fogging and the insulation defects of the various components disturb the application of the theoretical principle of adding the brightnesses of the various superimposed light signals. Furthermore, imperfections inherent to the type of screen used, and/or to the conditions of its use, further add to this disturbance. The result of the foregoing is that, by applying the commands $C_R$, $C_G$ and $C_B$, as defined above, to the input of an RGB video projector, the brightness values obtained on the screen are not exactly those expected. In other words, the spectrum of the restored light signal is not perfectly faithful to the spectrum $S(\lambda)$ of the signal to be restored. Hereinafter, the term "nonlinearities" denotes all phenomena which lead to this imperfection in the light restoration device.

So as to best eliminate the effect of these non-linearities, the invention makes provision for the use of compensation means in each light restoration unit used. The compensation consists in converting colorimetric coordinates of the light signal to be restored, obtained for example by projecting the spectrum $S(\lambda)$ of the light signal to be restored onto the coordinate system of any colorimetric system, into command values, in the colorimetric system of the light unit, which are suitable for driving this light restoration unit so as to faithfully restore said light signal, that is to say to restore a light signal which is free of disturbances due to the nonlinearities. In other words, the commands $C_R$, $C_G$ and $C_B$ which should be applied to the input of an RGB video projector to display this light signal are determined, no longer directly by the formulae summarized above which give the colorimetric coordinates of the light signal to be restored in the coordinate system of the colorimetric system of the light restoration unit, but from these colorimetric coordinates to which a conversion correcting the effect of the nonlinearities has been applied.

A calibration table is created and stored, for each video projector of the device, during a calibration phase prior to operation of the device in normal restoration mode. This table comprises, for a certain number of particular command triplets $C_R$, $C_G$, $C_B$, the colorimetric coordinates, in a particular colorimetric system, of the signal which is restored by the video projector when these commands are applied to it. For the sake of simplifying the notations used, the colorimetric coordinates obtained by projecting the spectrum of the restored signal onto the coordinate system of the XYZ colorimetric system are considered. But it is clearly understood that this is not limiting. However, and independently of the need to simplify the notations used, mentioned above, it will be seen that the use of colorimetric coordinates in the XYZ system is advantageous. This calibration table can be generated automatically under the control of software driving three video cards (or preferably one trichromatic video card) with said particular command triplets $C_R$, $C_G$, $C_B$ and recovering the signal output from the video projector on a spectrophotometer or a calorimeter. This output signal is then projected, by numerical computation, onto the coordinate system of the XYZ system. This calibration table, subsequently called RGB_TO_XYZ, enables the colorimetric coordinates of the signal restored in the coordinate system of the XYZ system to be known when the commands $C_R$, $C_G$, $C_B$ are applied to the input of the RGB video projector. The table RGB_TO_XYZ is a three-dimensional table indexed by the three commands $C_R$, $C_G$ and $C_B$. Each command is encoded over 8 bits. Of course, the values of the triplets $C_R$, $C_G$, $C_B$ are chosen so as to substantially cover the entire useful spectrum of the video projector. Each of the three colorimetric coordinates of the signal restored in the coordinate system of the XYZ system is encoded over 16 bits. There is therefore a total of 48 bits of digital data stored in the table RGB_TO_XYZ.

The calibration phase then comprises a step of creating and storing another table, called a conversion table and subsequently called XYZ_TO_RGB, obtained by inverting the calibration table RGB_TO_XYZ. More specifically, for each triplet of colorimetric coordinates $X_0$, $Y_0$, $Z_0$ of a set comprising about one thousand of such triplets which correspond (in the coordinate system of the XYZ system) to the same number of particular light signals substantially covering the entire useful spectrum of the video projector, the following steps are carried out:

a) determining the M triplets of colorimetric coordinates $X_j$, $Y_j$, $Z_j$ (where j ranges from 1 to M) stored in the calibration table RGB_TO_XYZ which are the "closest" to the triplet $X_0$, $Y_0$, $Z_0$;

b) determining the M command triplets $C_{Rj}$, $C_{Gj}$, $C_{Bj}$ (where j ranges from 1 to M) associated with these M triplets of colorimetric coordinates $X_j$, $Y_j$, $Z_j$;

c) determining a triplet of integer colorimetric coordinates $C_{R0}$, $C_{G0}$, $C_{B0}$, obtained by interpolation of said M triplets $C_{Rj}$, $C_{Gj}$, $C_{Bj}$ (where j ranges from 1 to M) and taking into account just the integer value of each component of the triplet arising from this interpolation;

d) storing said triplet $C_{R0}$, $C_{G0}$, $C_{B0}$ in the conversion table XYZ_TO_RGB of the video projector.

The conversion table therefore associates with colorimetric coordinate values of a particular light signal, encoded over 16 bits, command values to be applied to the light restoration units in order to generate a light signal as close as possible to said particular light signal, each command value being encoded over 8 bits. The interpolation involved in step c) above may be of the linear, quadratic or other type. It will be noted that the size of the calibration table RGB_TO_XYZ must be enough to allow this interpolation. In practice, a table with about a thousand inputs ($C_R$, $C_G$, $C_B$ triplets) is enough. The size of the calibration table RGB_TO_XYZ (expressed as number of bytes of memory) may advantageously be determined dynamically, by allocating the necessary memory space, given the characteristics of the video projector during calibration. This makes it possible to use only the measurement time, the calculation time (especially for inverting this table giving the conversion table) and the memory space which are necessary in order to obtain enough calibration for the video projector. Given the high number of values in the calibration table RGB_TO_XYZ, the concept of closeness involved in step a) may be defined very simply as a function of a Cartesian distance defined mathematically. It will be noted that resorting to the XYZ system in order to break down the signal to be restored into colorimetric coordinates is advantageous since, according to this system, the component Y alone carries the main brightness information for the signal, the two other components X and Z mainly carrying chromatic information. This feature facilitates the implementation of step a) to the extent that the concept of closeness can be applied mainly to this component.

Figure 8:
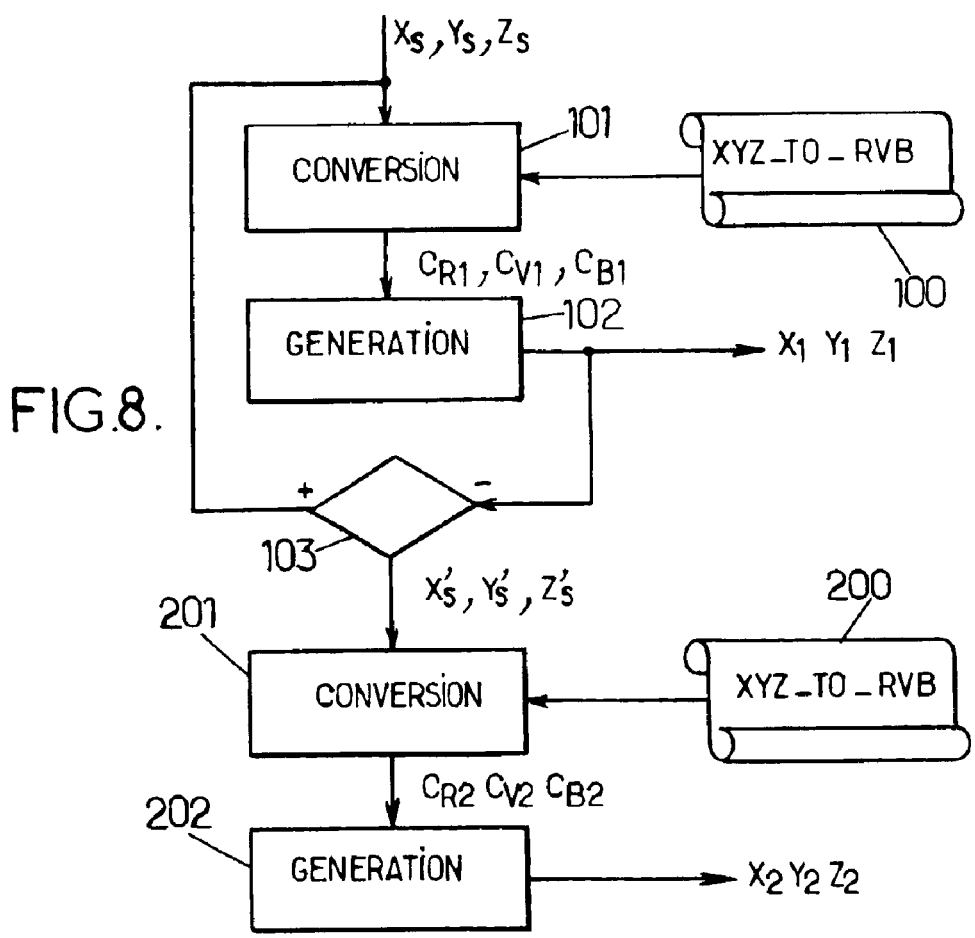
FIG. 8: the flowchart of a process for practically implementing the method according to the invention.

The flowchart of FIG. 8 illustrates the steps of the method for light restoration as they are implemented, in practice, with a device as shown schematically in FIG. 5, but which would not be linear. However, the assumption is made according to which the brightness response of the device, which is not linear, is nevertheless an increasing function of the commands applied to the light restoration units. Any light signal S to be restored can be considered. The three colorimetric coordinates of the signal S in the coordinate system of the XYZ system are delivered by the CPU unit in the form of digital data encoded over 16 bits each (that is 48 bits in total). These are called $X_S$, $Y_S$, $Z_S$. A conversion step 101 enables, according to the conversion table XYZ_TO_RGB of the first more powerful video projector V1, referenced 100, the command values $C_{R1}$, $C_{G1}$, $C_{B1}$ to be obtained, each one encoded over 8 bits, which must be applied to said video projector V1 in order to generate a light signal which is as close as possible to the signal S. A generation step 102 enables, by means of the video projector V1, according to said commands $C_{R1}$, $C_{G1}$, $C_{B1}$, a first light signal to be generated, the brightness of which is less than that of the signal S, given the definition of the values of the conversion table (see step c) of the method of obtaining this table above) and also given the assumption formulated above. This first signal is defined, in the XYZ system, by the coordinates $X_1$, $Y_1$, $Z_1$. Next, a step 103 consists in determining the difference between the coordinates $X_S$, $Y_S$, $Z_S$ of the light signal S to be restored and the coordinates $X_1$, $Y_1$, $Z_1$ of said first signal. It will be noted that the latter are obtained by reading from the calibration table RGB_TO_XYZ of the first video projector V1 as a function of the triplet $C_{R1}$, $C_{G1}$, $C_{B1}$. Thus, the coordinates $X_S'$, $Y_S'$, $Z_S'$ of a first error signal are obtained, which corresponds to the accuracy with which the video projector V1 is capable of displaying the light signal S to be restored.

The steps above are then repeated for the first error signal $X_S'$, $Y_S'$, $Z_S'$, so as to restore this error signal by means of the second less powerful video projector V2. More specifically, a conversion step 201 makes it possible, as a function of the conversion table XYZ_TO_RGB of the second less powerful video projector V2, referenced 200, to obtain the command values $C_{R2}$, $C_{G2}$, $C_{B2}$ which must be applied to said video projector V2 in order to generate a light signal which is as close as possible to the error signal $X_S'$, $Y_S'$, $Z_S'$. A generation step 202 enables a second light signal to be generated by means of the video projector V2 as a function of said commands $C_{R2}$, $C_{G2}$, $C_{B2}$. This second signal is defined, in the XYZ system, by the coordinates $X_2$, $Y_2$, $Z_2$. It will be noted that the latter are obtained by reading from the calibration table RGB_TO_XYZ of the second video projector V2 as a function of the triplet $C_{R2}$, $C_{G2}$, $C_{B2}$.

A resulting signal is generated, as previously indicated, by superimposing the first and second light signals above. Of course, this resulting signal differs from the light signal S to be restored with a difference which is expressed as a second error signal and which corresponds to the error with which the second video projector V2 is capable of restoring the first error signal $X_S''$, $Y_S''$, $Z_S''$. It is then possible to read the colorimetric coordinates $X_2$, $Y_2$, $Z_2$ of the second signal in the calibration table RGB_TO_XYZ of the second video projector V2, to calculate the difference between the coordinates $X_S$, $Y_S$, $Z_S'$ and the coordinates $X_2$, $Y_2$, $Z_2$ in order to obtain the coordinates $X_S''$, $Y_S''$, $Z_S''$ of the second error signal, then to repeat the steps above for the purpose of restoring this second error signal $X_S''$, $Y_S''$, $Z_S''$ by means of a third video projector. And so on, etc.

The steps of the method are executed under the control of the central processing unit CPU (FIG. 6). The conversion steps 101, 201, etc. are carried out by means of the conversion tables XYZ_TO_RGB 100 and 200 of each video projector which are stored in an ROM memory of the management unit 10. The difference calculation steps 103, etc. are carried out by means of the calibration tables RGB_TO_XYZ of each video projector, which are also stored in the ROM memory of the management unit 10. In some applications the calibration phase prior to the normal operation in restoration mode must be carried out on each start up of the device. In this case, the calibration and conversion tables may be stored in the RAM memory which is a random-access memory.

Compensation for the nonlinearities of the light restoration device thus obtained is in practice simple to implement since it does not require accurate knowledge or modeling of the behavior thereof. Only the equation between the outputs and the inputs of the device is taken into account, and this is determined experimentally, by generating a calibration table for each video projector, as has been described.

What is claimed is:

1. A method of restoring a light signal from digital data defining at least one colorimetric coordinate of the light signal in a particular colorimetric system, each colorimetric coordinate being encoded over a given number N of data bits and corresponding to a brightness value associated with a particular component of the light signal in the colorimetric system, the method comprising the steps of:

a) processing said data bits so as to generate a first light signal, by means of a first light restoration unit which can produce brightness values in a first set of discrete values covering a first dynamic brightness range;

b) processing said data bits so as to generate at least a second light signal, by means of a second light restoration unit which can produce brightness values in a second set of discrete values covering a second dynamic brightness range, less than said first dynamic brightness range, the second light restoration unit having a brightness resolution which is finer than the first light restoration unit;

c) generating a third light signal obtained by superimposing said first and second light signals.

2. The method as claimed in claim 1, wherein the second dynamic range corresponds substantially to the brightness resolution of the first light restoration unit.

3. The method as claimed in claim 1, wherein the first light signal generated by the first light restoration unit in step a) has a brightness value defined as being the brightness value of said first set which is just less than said particular brightness value.

4. The method as claimed in claim 3, wherein the second light signal generated by the second light restoration unit in step b) has a brightness value defined as being the brightness value of said second set which is just less than, or closest to the difference between said particular brightness value and said brightness value of said first set which is just less than said particular brightness value.

5. The method as claimed in claim 1, wherein step a) consists in generating a command for the first light restoration unit encoded over q bits and step b) consists in generating a command of the second light restoration unit encoded over N–q bits where q is an integer such that $1 \leq q < N-1$.

6. The method as claimed in claim 5, wherein the maximum light flux of the first light restoration unit is K times higher than that of the second light restoration unit, where $K=2^q$.

7. The method as claimed in claim 5, wherein the first set comprises $2^q$ discrete values and in that the second set comprises $2^{N-q}$ discrete values.

8. The method as claimed in claim 1, wherein the first set comprises brightness values which are regularly distributed over the first dynamic range, such that the first light restoration unit covers the first dynamic range with brightness steps which are substantially equal to a first step value.

9. The method as claimed in claim 1, wherein the second set comprises brightness values regularly distributed over the second dynamic range such that the second light restoration unit covers the second dynamic range with brightness steps which are substantially equal to a second step value.

10. The method as claimed in claim 8, wherein the second set comprises brightness values regularly distributed over the second dynamic range such that the second light restoration unit covers the second dynamic range with brightness steps which are substantially equal to a second step value, and wherein the second step value is less than the first step value.

11. The method as claimed in claim 5, wherein the value of N is sixteen (N=16) and wherein the value of q is eight (q=8).

12. The method as claimed in claim 1, wherein step c) is carried out by optical superposition of the first and second light signals projected onto a screen.

13. The method as claimed in claim 1, wherein step c) is carried out by optical superposition of the first and second light signals before projection onto a screen.

14. The method as claimed in claim 1, wherein the colorimetric system being the trichromatic Red, Green, Blue system, steps a) to c) are executed for each of the three components of the light signal in this colorimetric system.

15. A device for restoring a light signal from digital data defining at least one colorimetric coordinate of the light signal in a particular colorimetric system, each colorimetric coordinate being encoded over N data bits and corresponding to a brightness value associated with a particular component of the light signal in the colorimetric system, comprising:
- a first light restoration unit which can produce brightness values in a first set of discrete values covering a first dynamic brightness range;
- at least a second light restoration unit which can produce brightness values in a second set of discrete values covering a second dynamic brightness range, less than said first dynamic brightness range, the second light restoration unit having a brightness resolution which is finer than the first light restoration unit; and,
- management means to control said first and second light restoration units as a function of said N data bits so that they produce a first and a second light signal, respectively, said first and second light restoration units furthermore being arranged to produce a third light signal obtained by superimposing said first and second light signals.

16. The device as claimed in claim 15, wherein the second dynamic range corresponds substantially to the brightness resolution of the first light restoration unit.

17. The device as claimed in claim 15 wherein the management means deliver a command to the first light restoration unit encoded over q bits and a command to the second light restoration unit encoded over N−q bits, where q is an integer such that $1 \leq q < N-1$.

18. The device as claimed in claim 17, wherein the second light restoration unit presents a maximum light flux which is K times smaller than that of the first light restoration unit.

19. The device as claimed in claim 18, wherein the second light restoration unit presents a nominal maximum flux equal to that of the first light restoration unit, but is coupled to filtering means making it possible to reduce the maximum flux that it can generate by a factor equal to K.

20. The device as claimed in claim 18, wherein $K=2^q$.

21. The device as claimed in claim 17, wherein the first set comprises $2^q$ discrete values and wherein the second set comprises $2^{N-q}$ discrete values.

22. The device as claimed in claim 15, wherein the first set comprises brightness values which are regularly distributed over the first dynamic range, such that the first light restoration unit covers the first dynamic range with brightness steps which are substantially equal to a first step value.

23. The device as claimed in claim 15, wherein the second set comprises brightness values which are regularly distributed over the second dynamic range such that the second light restoration unit covers the second dynamic range with brightness steps which are substantially equal to a second step value.

24. The device as claimed in claim 22, wherein the second step value is less than said first step value.

25. The device as claimed in claim 17, wherein the value of N is sixteen (N=16) and in that the value of q is eight (q=8).

26. The device as claimed in claim 15, wherein it comprises a screen and in that the first and second light restoration units are arranged in order to project simultaneously the first and second light signals onto said screen such that the third light signal is obtained by their optical superposition on said screen.

27. The device as claimed in claim 15, further comprising output optics and means to collimate the first and second light signals onto said output optics.

28. The device as claimed in claim 15, further comprising means for adjusting the superposition of the images generated by the first and by the second image restoration unit, respectively.

29. The device as claimed in claim 15, further comprising means of correcting brightness uniformity defects of the light restoration units.

30. The device as claimed in claim 15, further comprising means of correcting geometrical distortion defects and of setting the light restoration units.

31. The device as claimed in claim 15, further comprising means to determine the commands to be applied to the light restoration units, as a function of the colorimetric coordinates of the light signal to be restored, so as to compensate for the effect of the nonlinearities of the device.

32. The device as claimed in claim 31, further comprising a conversion table which associates commands to be applied to the light restoration units with the colorimetric coordinate values, in a particular colorimetric system, of the light signal to be restored.

33. The device as claimed in claim 32, wherein the conversion table is obtained by inverting a calibration table which associates the colorimetric coordinates, in said particular colorimetric system, of the signal which is restored by the light restoration units when these commands are applied thereto, for a certain number of particular commands.

34. The device as claimed in claim 15, wherein the screen is of the Fresnel lens type.

* * * * *